United States Patent [19]

Yajima et al.

[11] 4,248,814
[45] Feb. 3, 1981

[54] PROCESS FOR PRODUCING CERAMIC SINTERED BODIES

[75] Inventors: Seishi Yajima; Kiyohito Okamura; Toetsu Shishido, all of Ohnuki, Japan

[73] Assignee: The Foundation: The Research Institute for Special Inorganic Materials, Asahi, Japan

[21] Appl. No.: 5,882

[22] Filed: Jan. 23, 1979

[30] Foreign Application Priority Data

Jan. 31, 1978 [JP] Japan .................................. 53-8900

[51] Int. Cl.³ ............................................. C04B 35/58
[52] U.S. Cl. ........................................ 264/63; 264/65
[58] Field of Search ........................... 264/63, 65, 29.5

[56] References Cited

U.S. PATENT DOCUMENTS

| 3,520,656 | 7/1970 | Meadows. | |
|---|---|---|---|
| 4,110,386 | 8/1978 | Yajima et al. | 264/29.5 |
| 4,112,139 | 10/1978 | Yajima et al. | 264/65 |
| 4,117,057 | 9/1978 | Yajima et al. | 264/63 |

Primary Examiner—John Parrish
Attorney, Agent, or Firm—Ladas & Parry

[57] ABSTRACT

A process for producing a heat-resistant ceramic sintered body, which comprises preparing polycarbosilane partly containing siloxane bonds by adding 0.01 to 15% by weight of polyborosiloxane containing phenyl groups in at least a part of the side chains of Si and having a skeletal structure composed of B, Si and O to a polysilane having the structure

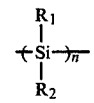

wherein n is at least 3, and $R_1$ and $R_2$, independently from each other, represent methyl, ethyl, phenyl or hydrogen, and heating the polymer mixture in an atmosphere inert to the reaction thereby polymerizing it; mixing said polycarbosilane with a ceramic powder composed of at least one member selected from the group consisting of oxides, carbides, nitrides, borides and silicides; shaping the resulting mixture; and simultaneously with, or after, the shaping of the mixture, sintering the mixture at a temperature of from 800° C. to 2,000° C. in vacuum or in an atmosphere composed of at least one gas selected from the group consisting of inert gases, carbon monoxide gas, carbon dioxide gas, hydrogen gas, nitrogen gas and hydrocarbon gases.

4 Claims, No Drawings

PROCESS FOR PRODUCING CERAMIC SINTERED BODIES

FIELD OF THE INVENTION

This invention relates to a process for producing sintered bodies of heat-resistant ceramics.

Particularly, the invention pertains to a process for producing a sintered body of a heat-resistant ceramic, which comprises the step of mixing a powder of a heat-resistant ceramic with polycarbosilane partly containing siloxane bonds and shaping the mixture, said polycarbosilane being prepared by a specified method; and the step of sintering the shaped mixture in vacuum or in an atmosphere of at least one gas selected from the group consisting of inert gases, carbon monoxide gas, carbon dioxide gas, hydrogen gas, nitrogen gas and hydrocarbon gases.

BACKGROUND OF THE INVENTION

Known sintered bodies which have been used in many applications as thermally stable ceramics include oxides such as $Al_2O_3$, BeO, MgO, $ZrO_2$ and $SiO_2$, carbides such as SiC, TiC, WC and $B_4C$, nitrides such as $Si_3N_4$, BN and AlN, borides such as $TiB_2$ and $ZrB_2$, silicides such as $WSi_2$ and $CrSi_2$, and ternary or higher compounds of these. These ceramic sintered bodies have been produced by shaping powders of these and sintering the shaped powders at extremely high temperatures.

Investigations have been extensively undertaken in recent years with a view to producing less porous high-density sinters at relatively low pressures or relatively low sintering temperatures by using certain additives. If suitable additives are used, the self-sinterability of ceramics can be increased and simultaneously, the abnormal growth of the particles of sintered bodies can be inhibited to prevent the remaining of pores among the particles. Furthermore, the grain boundary can be filed with the additives in high density. Accordingly, high-density sintered bodies can be obtained with economical advantage.

Additives of this kind which have been used heretofore include, for example, MgO and NiO for $Al_2O_3$, CaO and $TiO_2$ for $ZrO_2$, $Al_2O_3$ and $Y_2O_3$ for $Si_3N_4$, B, Si and C for SiC, Ni and WC for TiC, and $ZrO_2$ and $CrB_2$ for $ZrB_2$. Thus, any of such additives are oxides. Although less frequently, metallic elements are also used as the additives, and moreover, for example, for a given carbide, another carbide is added and for a given boride, another boride is added. The reason for selecting these additives is that an interaction between the substrate ceramic and such an additive takes place so as to facilitate the sintering of the ceramic having poor self-sinterability, or that such an additive becomes plastic or liquid at high temperatures so that the sintering of the ceramic easily proceeds.

These conventional additives, however, have various defects as will be described below. In the production of a high-density sintered body by a solid-phase reaction between the additive and a ceramic substrate, second and third phases occur as a result of reaction between the additive and the ceramic and are present mainly in the crystal grain boundary. When the temperature becomes high, plastic deformation tends to take place in these phases which constitute the grain boundary, and in many cases, it is difficult to produce sintered bodies which have high strength at high temperatures. For example, when MgO is added to $Si_3N_4$, a vitreous phase of $SiMgO_3$ results as a second phase, and fills the grain boundary to make the product highly dense. However, the product has the defect that since the vitreous phase softens at high temperatures, the mechanical strength of the sintered body abruptly begins to decrease at about 1000° C. In the production of high-density sintered bodies by utilizing the plastication or liquefaction of additives, the strength of the product decreases markedly at high temperatures because of plastic deformation or liquid flow in the grain boundary. Among the conventional additives, those which would not cause a reduction in strength at high temperatures are other than the oxides which tend to become vitreous and the metallic elements which tend to become liquid. Solid powders of the carbides or borides, however, have poor self-sinterability, and cannot be expected to produce an effect of giving high-density sintered bodies.

It is an objective of this invention to provide a process for producing a heat-resistant ceramic sintered body having superior mechanical strength at room temperature and higher temperatures by using a new additive which densely fills the grain boundary and increases the sinterability of the ceramic substrate in the process of sintering, inhibits the growth of coarse particles of the ceramic, and which does not cause plastic deformation at high temperatures.

The strength of the ceramic sintered body in accordance with this invention is equal to, or higher than, those of conventional ceramic sintered bodies in spite of the fact that its density is lower than those of the conventional ceramic sintered bodies.

In the copending U.S. patent application Ser. No. 953,518 filed Oct. 23, 1978, the present inventors suggest a process for producing novel polycarbosilane, and disclose that this process can afford polycarbosilane partly containing siloxane bonds which has superior properties. They have now found that the above objective of the present invention is achieved by using as the additive the polycarbosilane partly containing siloxane bonds obtained by the process described in the aforesaid U.S. patent application.

SUMMARY OF THE INVENTION

According to this invention, there is provided a process for producing a heat-resistant ceramic sintered body which comprises preparing polycarbosilane partly containing siloxane bonds by adding 0.01 to 15% by weight of polyborosiloxane containing phenyl groups in at least a part of the side chains of Si and having a skeletal structure composed of B, Si and O to a polysilane having the structure

wherein n is at least 3, and $R_1$ and $R_2$, independently from each other, represent methyl, ethyl, phenyl or hydrogen, and heating the polymer mixture in an atmosphere inert to the reaction thereby polymerizing it; mixing said polycarbosilane with a ceramic powder composed of at least one member selected from the group consisting of oxides, carbides, nitrides, borides and silicides; shaping the resulting mixture; and simultaneously with, or after, the shaping of the mixture, sintering the mixture at a temperature of from 800° C. to 2000° C. in vacuum or in an atmosphere composed of at least one gas selected from the group consisting of inert gases, carbon monoxide gas, carbon dioxide gas, hydrogen gas, nitrogen gas and hydrocarbon gases.

DETAILED DESCRIPTION OF THE INVENTION

The important feature of the process of this invention consists in the use of polycarbosilane partly containing siloxane bonds (to be sometimes referred to as siloxane bond-containing polycarbosilane) produced by the process disclosed in U.S. patent application Ser. No. 953,518 as an additive.

The process for producing the siloxane bond-containing polycarbosilane is the subject matter of the copending U.S. patent application Ser. No. 953,518, and the specification and claims of this U.S. application are cited herein as a related reference. The production of the siloxane bond-containing polycarbosilane will first be described.

The polycarbosilane used in this invention as an additive is prepared by the reaction of a specified polysilane with polyborosiloxane.

Polysilane, as one starting material, is a polymer having a structural unit of the formula

wherein n is at least 3, preferably 5 to 100, and $R_1$ and $R_2$ bonded to each Si atom forming the skeleton of the polysilane are identical or different and each represents methyl, ethyl phenyl or hydrogen. The polysilane may be linear or cyclic or both linear and cyclic. When the side chain of the polysilane consists of two or more of methyl, ethyl, phenyl and hydrogen, the order of arrangement of different kinds of side-chain groups in the polysilane may be optional. Polysilane having a structural unit composed only of

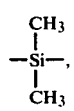

and polysilane whose side chains consist of at least 50% of methyl groups and the balance being phenyl groups and/or hydrogen atoms are especially suitable for use as the starting material. Linear polysilane preferably contains hydroxyl or methyl as a terminal group.

Polysilane is usually produced by dechlorinating at least one dichlorosilane with sodium. The dechlorination of one dichlorosilane is schematically shown as follows:

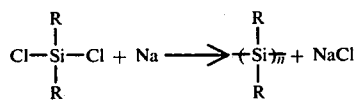

Another starting material used in the production of polycarbosilane is polyborosiloxane (to be sometimes referred to hereinbelow as phenyl-containing polyborosiloxane) having a skeletal structure compound of B, Si and O and containing phenyl groups at least as a part of the side chains bonded to Si.

The phenyl-containing polyborosiloxane is disclosed in detail in U.S. patent application Ser. No. 835,373 filed on Sept. 21, 1977, now U.S. Pat. No. 4,152,509, by the present inventors with regard to a method for its production and its structure and properties. A convenient method for producing the phenyl-containing polyborosiloxane is the dehydrochlorination-condensation reaction of boric acid with at least one diorganodichlorosilane (the organo group consists at least partly of phenyl). The condensation reaction at this time is assumed to take place in the following manner when the reaction of diphenyldichlorosilane and boric acid is taken up as an example.

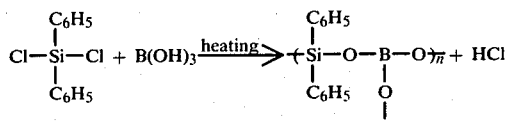

When the phenyl-containing polyborosiloxane is to be produced by the aforesaid reaction, the diorganodichlorosilane is preferably diphenyldichlorosilane and/or methylphenyldichlorosilane, or a mixture of any of these with dimethyldichlorosilane.

The phenyl-containing polyborosiloxane can also be produced by the dealcoholization-condensation reaction of boric acid with at least one diorganodialkoxysilane, or the deesterification-condensation reaction of a boric acid ester such as $B(OCH_3)_3$ with a diorganodialkoxysilane (the organo group consists at least partly of phenyl groups).

Since the condensation reaction in the various methods described above is fairly complex, the structure of the phenyl-containing polyborosiloxane as a condensate cannot be completely determined. It is assumed however that the polyborosiloxane is composed mainly of a structural unit of the formula

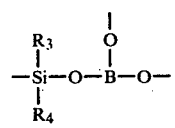

and a number of these structural units are combined complicatedly to form the polymer.

The polyborosiloxane may be of a linear, branched or cyclic structure, and also of a complicated structure resulting from the crosslinking of these polyborosiloxanes.

In the polyborosiloxane used as one starting material for producing the polycarbosilane in this invention, the side chains bonded to a silicon atom ($R_3$ and $R_4$ in the above formula) should consist at least partly of phenyl groups. A preferred polyborosiloxane is the one in which at least 50% of the entire side-chains bonded to Si in the polymer consists of phenyl groups, and the balance being lower alkyl groups such as methyl and/or hydrogen.

The phenyl containing polyborosiloxanes usually have a number average molecular weight of 500 to 10,000 and are characterized by excellent hydrolysis resistance and thermal stability. For example, polyborodiphenylsiloxane having a molecular weight of 2350 has a decomposition temperature of 300° C.

The siloxane bond-containing polycarbosilane used as an additive in this invention is prepared by adding 0.01 to 15% by weight of the phenyl-containing polyborosiloxane to the polysilane, and heating the mixture in an atmosphere inert to the reaction to polymerize it.

The polymerization reaction under heat must be carried out in an atmosphere of a gas which is inert to the reaction. If the polymerization reaction is carried out in an oxidizing atmosphere such as air, the starting polysilane will be oxidized, and the reaction will not proceed sufficiently. Nitrogen, argon and hydrogen are especially preferred as the inert gas.

It is generally preferred to perform the polymerization reaction at atmospheric pressure or at pressure near it. It is also preferred that the polymerization reaction be carried out while feeding the inert gas as a stream into the reaction zone.

The reaction temperature is usually at least 250° C., preferably 300° to 500° C., and the reaction time is usually 3 to 10 hours. The amount of the polyborosiloxane should be 0.01 to 15% by weight based on the polysilane. If the amount is less than 0.01% by weight, the effect of adding the polyborosilane is hardly obtained. On the other hand, when the amount exceeds 15% by weight, the inherent properties and utility of the polycarbosilane are impaired. The suitable amount of the polyborosiloxane is 0.05 to 10% by weight.

The siloxane bond-containing polycarbosilane produced by the process described hereinabove is obtained as a viscous liquid or a powder. Since the powder can be easily formed into a viscous liquid by heating it or by dissolving it in a solvent, it can be uniformly distributed throughout the substrate ceramic particles unlike conventional powdery additives. The siloxane bond-containing polycarbosilane forms highly active Si, C, O, B or volatile substances when heated at 800° to 2000° C. in vacuum or in an atmosphere of at least one member selected from inert gases, carbon dioxide gas, carbon monoxide gas, hydrogen gas, nitrogen gas and hydrocarbon gases. The sinterability of the ceramic can be increased by the content of these substances with the substrate ceramic. Furthermore, high-melting substances such as SiC, $B_4C$, $Si_3N_4$ (formed when heated in $N_2$), and C formed from the highly active substances, Si, C, O and B, or various high-melting substances such as those formed by the reaction of the substrate ceramic with the highly active substances, Si, C, O and B are present mainly in the grain boundary to inhibit the abnormal growth of the ceramic particles. Since the high melting substances filling the grain boundary also have very high mechanical strength at high temperatures, the strength at high temperatures of the sintered product as a whole is not reduced.

When heated, the siloxane bond-containing polycarbosilane used as an additive decomposes. Organic substances containing some carbons, hydrogens, oxygens, silicons and borons volatilize, and the remaining carbons, oxygens, silicons and/or borons react with the substrate ceramic to form compounds which fill the interstices among the ceramic particles. This reaction begins at about 500° C., and ends at about 1500° C. During this time, the ceramic particles themselves are also sintered. In the process of sintering, the additive acts not only as a binder, but also as a sintering aid and a coarse grain growth inhibitor. Since the various compounds formed in the grain boundary of the ceramic in the heating step are usually composed of very fine particlers having a size of not more than 100 Å, the resulting sintered body has superior thermal shock resistance. Furthermore, because these compounds are mainly SiC, $Si_3N_4$, $B_4C$, C, etc., they have very good high-temperature mechanical strength, oxidation resistance, corrosion resistance and thermal shock resistance and chemical durability. These superior properties are reflected in the entire sintered body. Because of the various advantages described above, the siloxane bond-containing polycarboxilane specified in this invention can be used as a very advantageous additive.

According to the process of this invention, the additive is mixed usually in an amount of 0.05 to 20% by weight with a ceramic powder. As will be described hereinbelow, the amount of the additive varies depending upon the method of sintering under pressure. If the amount is less than 0.05%, it is difficult to obtain sintered bodies having high strength. If it is added in an amount of more than 20%, swelling partly occurs in the sintered body, and its strength decreases. It is usually advantageous therefore to limit the amount of the additive to the range of 0.05 to 20% by weight.

The ceramic powder to be mixed with the siloxane bond-containing polycarbosilane by the process of this invention is, for example, a powder of an oxide such as $Al_2O_3$, BeO, MgO, $ZrO_2$ or $SiO_2$, a carbide such as SiC, TiC, WC or $B_4C$, a nitride such as $Si_3N_4$, BN or AlN, a boride such as $TiB_2$ or $ZrB_2$, a silicide such as $MoSi_2$, $WSi_2$ or $CrSi_2$, or a mixture thereof, or a ternary or higher compound of these. Another example of suitable ceramic powder is a ceramic powder obtained by heating the aforesaid siloxane bond-containing polycarbosilane in vacuum or in an atmosphere composed of at least one gas selected from the group consisting of inert gases, carbon monoxide gas, carbon dioxide gas, hydrogen gas, nitrogen gas and hydrocarbon gases, and pulverizing the product. The ceramic powder formed in this case consists of SiC as a main ingredient and small amounts of $B_4C$, C and $Si_3N_4$ (formed when heated in $N_2$). The use of such a ceramic powder can give a sintered body having high strength.

The mixture of the siloxane bond-containing polycarbosilane and the ceramic powder is shaped in a manner known per se, and the shaped article is sintered. The sintering can be performed by heating the mixture after shaping it, or by a hot press method in which the shaping and sintering of the mixture are carried out simultaneously.

When the sintering is carried out after the shaping, the mixture of the ceramic powder and the additive is pressed at a pressure of 100 to 5,000 $kg/cm^2$ by a customary shaping method such as a mold press, rubber press, extrusion or sheet-forming method to form a shaped article of a predetermined configuration. Subsequent heating of the shaped article can give the heat-resistant ceramic sintered body of this invention.

When the sintering is carried out by the hot press method which performs the shaping and sintering simultaneously, a press former made of a material (selected from graphite, alumina, boron nitride, etc.) which does not react with the ceramic substrate is used, and the mixture of the ceramic powder and the additive are heated simultaneously with the pressing of the mixture by the press former, thereby forming a sintered body.

The sintered body of this invention can be obtained by heating the shaped mixture at a temperature of from 800° C. to 2000° C. in vacuum or in an atmosphere consisting of at least one gas of the group consisting of inert gases, carbon monoxide gas, carbon dioxide gas, hydrogen gas, nitrogen gas and hydrocarbon gases.

In a preferred embodiment of the process of this invention, 3 to 5% by weight of the siloxane bond-containing polycarbosilane is mixed with a powder obtained by heating a mixture of the ceramic powder and the siloxane bond-containing polycarbosilane (in this case, the amount of the polycarbosilane is optional) in vacuum or in an atmosphere composed of at least one gas of the group consisting of inert gases, carbon monoxide gas, carbon dioxide gas, hydrogen gas, nitrogen gas and hydrocarbon gases, and pulverizing the resulting product. The resulting mixture is sintered after, or simultaneously with, the shaping of the mixture by the aforesaid method thereby to obtain a sintered body having a superior dimensional accuracy with reduced volume shrinkage.

In another embodiment of the process of this invention, the sintered shaped article is impregnated with liquid polycarbosilane. When the polycarbosilane is obtained as a liquid, it is directly used in the impregnation step. If it is obtained as a solid, it is heated, or dissolved in a solvent, to form a liquid before use in the impregnation step. If desired, the sintered body may be pressed to enhance the degree of impregnation. The polycarbosilane-impregnated sintered body is then heat at a temperature of 1,000° C. to 2,000° C. in vacuum or in an atmosphere of at least one gas selected from the group consisting of inert gases, carbon monoxide gas, carbon dioxide gas, hydrogen gas, nitrogen gas and hydrocarbon gases. A sintered body having a higher density and higher strength can be obtained by performing at least once a series of the impregnating and heating treatments described above. When the polycarbosilane is obtained as a liquid at room temperature or at relatively low heating temperatures, it can be used directly in the above process. If required, it may be dissolved in a small amount of a solvent capable of dissolving the polycarbosilane, such as benzene, toluene, xylene, hexane, ether, tetrahydrofuran, dioxane, chloroform, methylene chloride, petroleum ether, petroleum benzin, ligroin, Furon, dimethyl sulfoxide, and dimethylformamide in order to reduce the viscosity of the polycarbosilane.

The sintered ceramic bodies obtained by this invention can be used in applications which utilize their heat resistance, and for example, $B_4C$, $TiB_2$ and $ZrB_2$ sintered bodies may be used as neutron absorbers.

Other applications include the following.

(1) Architectural materials: panels, domes, trailer houses, walls, ceilings, floors, cooling towers, purifying tanks, water sewerage tanks, water supply tanks, hot water supply pipes, water drainage pipes, heat pipes for heat exchange, etc.

(2) Airplane materials and instruments and materials for aerospace exploitation: bodies, wings, drive shafts of helicopters, compressors of jet engines, rotors, stators, blades, compressor casings, housings, nose cones, rocket nozzles, braking material, tire cords, etc.

(3) Ship-building materials: boats, yachts, fishing boats, etc.

(4) Materials for road transporting vehicles: the front parts and side panels of motor vehicles, water tanks, lavatory units, seats, automobile bodies, containers, road machinery, guard rails, pallets, tanks for tank lorries, bicycles, autocycles, etc.

(5) Materials for anticorrosive machinery and instruments: tanks, tower ducts, stuffs, pipes, etc.

(6) Electrical materials: panel heaters, varistors, ignitors, thermocouples, etc.

(7) Sporting goods: boats, archery goods, skis, snow mobiles, water skis, glider bodies, tennis rackets, gold shafts, helmets, bats, racing jackets, etc.

(8) Machine elements: gaskets, packings, gears, braking materials, frictional materials, polishing and abrasive materials, etc.

(9) Materials for medical treatment: prosthetic legs and arms, etc.

(10) Acoustic instruments and materials: cantilevers, tone arms, speaker cones, voice coils, etc.

The following Examples further illustrate the present invention.

EXAMPLE 1

A 5-liter three-necked flask was charged with 2.5 liters of anhydrous xylene and 400 g of sodium, and they were heated to the boiling point of the xylene in a stream of nitrogen gas. One liter of dimethyldichlorosilane was added dropwise over the course of 1 hour. After the addition, the mixture was heated under reflux for 10 hours to form a precipitate. The precipitate was collected by filtration, and washed with methanol and then with water to afford 420 g of polydimethylsilane as a white powder.

Separately, 759 g of diphenyldichlorosilane and 124 g of boric acid were heated to 100° to 120° C. in n-butyl ether to afford a white resinous product. The product was heated in vacuum at 400° C. for 1 hour to afford 530 g of polyborodiphenylsiloxane.

Then, 0.125 g of polyborodiphenylsiloxane was mixed with 250 g of polydimethylsilane, and the mixture was heated in a stream of nitrogen to 320° C. in a 2-liter quartz tube equipped with a reflux tube and polymerized for 3 hours to form polycarbosilane partly containing siloxane bonds. The reaction product was allowed to cool to room temperature, and n-hexane was added. The solution was taken out, and n-hexane was evaporated. It was concentrated in vacuo by heating it to 280° C. to afford 84 g of a solid. The solid was soluble in benzene and had an average molecular weight of 960 and an intrinsic viscosity of 0.02.

The resulting polymer (10% by weight and 90% by weight of a powder of SiC having a size smaller than 325 mesh (ASTM) were mixed together with a suitable amount of benzene, dried, ground lightly in a mortar, and passed through a 100-mesh sieve (ASTM). The resulting powder was press-formed at a pressure of 2,000 kg/cm$^2$ in a mold (10×50 mm$^2$). The shaped product was heated to 1300° C. at a rate of 100° C./hr in N$_2$. A sintered body of SiC having a bulk density of 2.62 g/cm$^3$ and a flexural strength of 12.1 kg/mm$^2$ was obtained. This strength did not change substantially even at 1300° C.

EXAMPLE 2

Two hundred and fifty (250) grams of the same polydimethylsilane as used in Example 1 was mixed with 10.0 g of the same polyborodiphenylsiloxane as used in Example 1. The mixture was heated in a stream of nitrogen to 370° C. in the same apparatus as in Example 1, and polymerized for 5 hours to afford polycarbosilane partly containing siloxane bonds. The reaction product was allowed to cool to room temperature, and n-hexane was added. The solution was taken out, and n-hexane was evaporated to afford 176 g of a solid. The solid was soluble in benzene and had an average molecular weight of 1,720 and an intrinsic viscosity of 0.04.

The resulting polymer (15% by weight) and 90% by weight of a powder of B$_4$C having a size smaller than 325 mesh (ASTM) were mixed together with a suitable amount of benzene. The mixture was dried by distilling off the benzene, cold-shaped at 4,000 kg/cm$^2$, and heated to 1,200° C. in N$_2$. A B$_4$C sintered body having a bulk density of 1.70 kg/cm$^3$ and a flexural strength of 3.55 kg/mm$^2$ was obtained. This strength did not change substantially even at 1300° C.

EXAMPLE 3

A 5-liter three-necked flask was charged with 2.5 liters of anhydrous xylene and 400 g of sodium, and they were heated to the boiling point of xylene in a stream of nitrogen. A mixture of 965 g of dimethyldichlorosilane and 34.7 g of diphenyldichlorosilane was added dropwise over the course of 1.4 hours. After the addition, the mixture was heated under reflux for 18 hours to form a precipitate. The precipitate was collected by filtration, and washed first with methanol and then with water to afford 414 g of polysilane as a white powder in which the side chains of Si consisted of 2% of phenyl groups and the remainder being methyl groups.

The same polyborodiphenylsiloxane (8.0 g) as used in Example 1 was added to 250 g of the resulting polysilane, and the mixture was heated to 360° C. in a stream of nitrogen in the same way as in Example 1, and polymerized for 7 hours to form polycarbosilane partly containing siloxane bonds. The reaction product was allowed to cool to room temperature, and n-hexane was added. The solution was taken out, and n-hexane was evaporated to afford 213 g of a solid. The solid product was soluble in benzene and had an average molecular weight of 3,500 and an intrinsic viscosity of 0.06.

The polymer was added in an amount of 10% by weight to a powder of Si$_3$N$_4$ having a size smaller than 325 mesh (ASTM) and the mixture was cold-shaped in the same way as in Example 1. The shaped mixture was then heated to 1,200° C. in N$_2$. A sintered body of Si$_3$N$_4$ having a bulk density of 2.66 g/cm$^3$ and a flexural strength of 9.28 kg/mm$^2$ was obtained. This strength did not change substantially even at 1300° C.

EXAMPLE 4

The polymer used in Example 1 was heated at 600° C. in N$_2$, and then pulverized. A mixture consisting of 95% by weight of the resulting powder and 5% by weight of the polymer used in Example 1 was set in a carbon die, and hot-pressed at 1,800° C. for 0.5 hour in a stream of argon. The resulting sintered body consisted mainly of SiC, and had a bulk density of 3.00 g/cm$^3$ and a flexural strength of 38 kg/mm$^2$. This strength did not change substantially even at 1300° C.

What we claim is:

1. A process for producing a heat-resistant ceramic sintered body, which comprises preparing polycarbosilane partly containing siloxane bonds by adding 0.01 to 15% by weight of polyborosiloxane containing phenyl groups in at least a part of the side chains of Si and having a skeletal structure composed of B, Si and O to a polysilane having the structure

wherein n is at least 3, and R$_1$ and R$_2$, independently from each other, represent methyl, ethyl, phenyl or hydrogen, and heating the polymer mixture in an atmosphere inert to the reaction thereby polymerizing it; mixing said polycarbosilane with a ceramic powder composed of at least one member selected from the group consisting of oxides, carbides, nitrides, borides and silicides; shaping the resulting mixture; and simultaneously with, or after, the shaping of the mixture, sintering the mixture at a temperature of from 800° C. to 2,000° C. in vacuum or in an atmosphere composed of at least one gas selected from the group consisting of inert gases, carbon monoxide gas, carbon dioxide gas, hydrogen gas, nitrogen gas and hydrocarbon gases.

2. The process of claim 1 wherein the ceramic powder is a ceramic powder obtained by heating said polycarbosilane partly containing siloxane bonds in vacuum or in an atmosphere composed of at least one gas selected from the group consisting of inert gases, carbon monoxide gas, carbon dioxide gas, hydrogen gas, nitrogen gas and hydrocarbon gases, and pulverizing the heated polymer.

3. The process of claim 1 wherein the mixture of the polycarbosilane and ceramic powder is heated at a temperature of not more than 800° C. in vacuum or in an atmosphere of at least one gas selected from the group consisting of inert gases, carbon monoxide gas, carbon dioxide gas, hydrogen gas, nitrogen gas and hydrocarbon gases, and then pulverized, the resulting powder is further mixed with the polycarbosilane partly containing siloxane bonds, and the mixture is then subjected to said shaping and sintering steps.

4. The process of claim 1 wherein the ceramic sinter obtained by the sintering is subjected at least once to a series of treatments consisting of impregnating the sinter with said polycarboxilane partly containing siloxane bonds and then heating the impregnated product at a temperature of from 800° C. to 2,000° C. in vacuum or in an atmosphere composed of at least one gas selected from the group consisting of inert gases, carbon monoxide gas, carbon dioxide gas, hydrogen gas, nitrogen gas and hydrocarbon gases.

* * * * *